Dec. 11, 1945.　　　A. R. PARILLA　　　2,390,661
AIRCRAFT STRUCTURE
Filed Oct. 23, 1940
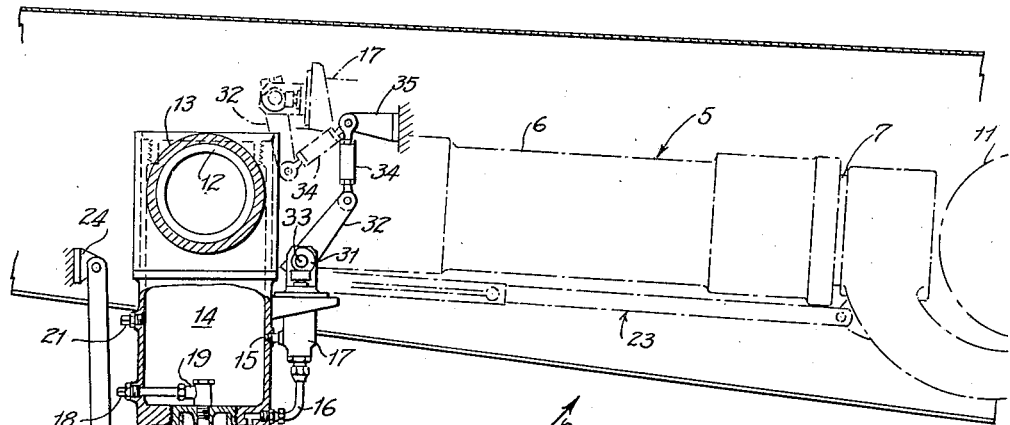
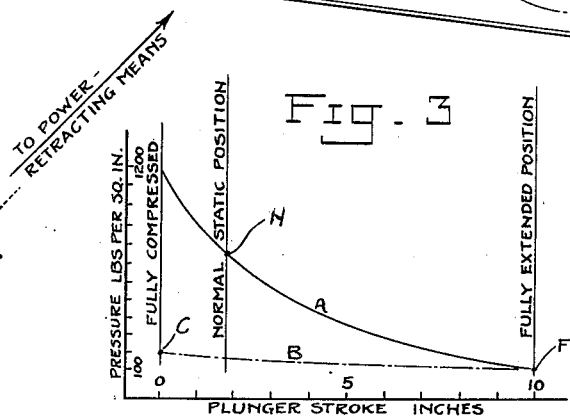
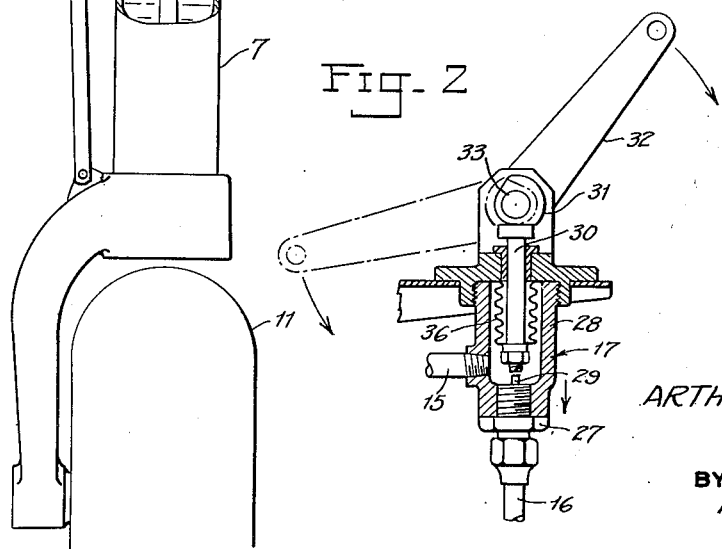
ARTHUR R. PARILLA
INVENTOR
BY
Robert C. Kasche
ATTORNEY Patented Dec. 11, 1945

2,390,661

UNITED STATES PATENT OFFICE 2,390,661

AIRCRAFT STRUCTURE

Arthur R. Parilla, Garden City, N. Y., assignor to Republic Aviation Corporation, a corporation of Delaware Application October 23, 1940, Serial No. 362,387

8 Claims. (Cl. 244—102)

This invention relates to retractable landing gear for airplanes, of the type in which the wheel-supporting shock strut swings into the airplane and is contracted endwise to minimize stowage.

In landing gear of this character, the pneumatic shock strut, being inflated to a relatively high pressure to sustain its load, necessitates an appreciable increase in this pressure in contracting the strut endwise, thus requiring excessive power and weighty mechanism to operate same, or necessitates minimizing the amount of contraction of the strut to such an extent that the advantages obtainable are greatly curtailed.

One of the objects of the present invention is to provide a simple and reliably operative landing gear adapted to retract and concomitantly contract the wheel-supporting shock strut completely while maintaining the inflation pressure of the strut substantially constant whether retracted or extended for landing.

Another object resides in the provision of means for eliminating substantially any pressure increase in the landing gear shock strut during contraction of the strut, while maintaining the usual shock absorbing characteristics of the strut when extended for landing, to thereby minimize the power required to effect retraction of the landing gear and materially reduce the weight and proportions of the operating parts.

In the drawing

Figure 1 is an elevational view, partly in section of the landing gear showing the extended and retracted positions of same.

Figure 2 is an enlarged sectional view of the valve shown in Figure 1, and

Figure 3 is a graph showing the pressure curves of the shock strut at various positions of the strut plunger.

An oleo pneumatic shock absorber strut 5 of conventional construction is shown, which comprises generally a cylinder 6 within which a plunger 7 telescopes, the latter carrying a metering pin 8 cooperating with an orifice in a piston 9 supported on a perforated tube 10 in the cylinder 6. In the broad aspect of the invention, the shock strut may be regarded as comprising mainly the cylinder and the telescoping plunger. The strut carries a landing wheel 11 and is pivotally mounted on trunnions 12 journalled in bearings 13, one of which is shown, secured to the wing of the airplane.

For purposes hereinafter manifest, an auxiliary chamber 14 is provided which is connected with the interior of the cylinder 6 by tubes 15 and 16 having a valve unit 17 controlling passage of air through said tubes.

The shock strut 5 may be inflated through a fitting 18 in the wall of the chamber 14, said fitting having a connection 19 within said chamber 14 to the interior of the cylinder 6. By removing the fitting 18 the connection 19 may be used to fill the shock strut with oil to a predetermined level as defined by a tube 20 depending into the cylinder 6 within the tube 10. A second fitting 21 is provided for inflating the chamber 14 independently of the shock strut.

Suitable means may be provided by which the landing gear is power-actuated to retracted or extended position, said means being operable, for example, on a rod 22 pivotally connected to the cylinder 6 of the shock strut.

Means are provided for pulling the plunger 7 up into the cylinder 6 during the retraction of the landing gear, said means comprising a tension member or link 23 connected at one end to the plunger, and pivotally anchored at its other end to a fixed member 24 on the wing. The link 23 preferably comprises two telescoping members, the maximum extension of which is limited by a pin 25 on one of the members playing in a slot in the other member. This construction of the link 23 is desired in order to allow the strut 5 to contract and expand freely during landing and taxiing of the airplane. The anchorage 24 of the link 23 is disposed eccentrically from the pivotal axis of the strut so that as the landing gear is swung to retracted position, the link 23 will draw the plunger 7 up into the cylinder 6, as shown in dot and dash outline in Figure 1.

The valve 17, shown in detail in Figure 2, includes a check valve and mechanism for positively opening the valve as the landing gear swings to or from retracted position. In the preferred embodiment, the check valve is similar in type to the well-known tire valve and is preferably arranged within the bore of a fitting 27 closing the bottom of a housing 28 of the valve proper. The check valve is so arranged as to open automatically in the direction of the arrow shown when a lower pressure occurs in the strut cylinder 6 which communicates with the valve through the tube 16. The check valve has a stem 29 projecting beyond the fitting 27 and adapted to be engaged by a push rod 30 slidably mounted in the upper end of the valve housing having a suitable pressure-tight device such as a bellows 36. A rotatable cam 31 engages the push rod 30 to positively open the check valve.

As shown in Figure 1, mechanism is provided for rotating the cam 31 as the landing gear is retracted or extended, said mechanism including an arm 32 fixed to a shaft 33 carrying the cam. The free end of arm 32 is connected by a link 34 to a fixed member 35 on the airplane, the arrangement of the parts being such that, as the landing gear is extended or retracted, the arm is moved through an appreciable arc, as indicated in Figure 2. It may be here noted that the valve 17 is mounted toward the far side of the strut, as viewed in Figure 1, to allow the valve arm 32 and link 34 to operate in a plane outside the strut. It is desired that the valve 17 be open immediately as the strut begins to retract, and be maintained open until the strut reaches a retracted position. To accomplish this, the cam 31 is shaped substantially as shown, with the high part of the cam continuing through an angular distance approximating the full stroke of the valve arm 32.

It is the usual practice to condition the landing gear for use when the airplane is on the ground. The shock strut 5 may be conditioned for use in a manner similar to present practice, that is, to inflate the strut cylinder 6 to a pressure ample to sustain the static weight of the airplane, as indicated at point N in the graph shown in Figure 3. It will be noted by tracing the curve A to point F, representing the fully extended position of the strut, that the pressure within the strut cylinder 6 is reduced materially when the strut is fully extended. The landing gear is further conditioned by inflating the auxiliary chamber 14 to a pressure corresponding to that in the strut cylinder when the strut is fully extended, that is, the pressure indicated at point F in the graph. The inflation of chamber 14 to the stated pressure is important, since any reduction of pressure in the strut cylinder during the retraction or extension of the landing gear is thus eliminated.

With the landing gear fully extended, the valve 17 is closed and the shock strut, therefore, functions in the usual way, independently of the auxiliary chamber 14. As the landing gear begins to retract, the link 23 begins to contract the strut, pulling the plunger up into the cylinder. During this initial interval the valve 17 is opened, thus interconnecting the cylinder and auxiliary chamber 14. In effect, this interconnection materially increases the volume within which the pressure increase occurs, with the result that the maximum increase in pressure is only slightly greater than the normal pressure within the strut cylinder. This will be apparent by reference to the graph shown in Figure 3. The curve A represents the actual pressure increase such as would occur if the strut were completely contracted without providing means for dissipating some of the pressure from the cylinder. The curve B represents the pressure rise occurring during the complete contraction of the strut with the cylinder and auxiliary chamber 14 interconnected. It will be seen that the resultant pressure increase under this condition is negligible as compared with the contraction of the strut without the auxiliary chamber.

The action of the mechanism in extending the landing gear from its fully retracted position is substantially the reverse of that described for its retraction. When fully retracted, the pressures in chamber 14 and cylinder 6 are substantially equlized, although the valve 17 is closed, in that said valve has been held open during substantially the entire retractive movement. This pressure is found in the graph at point C of the curve B. As the landing gear begins movement toward extended position, the valve 17 is again opened, interconnecting chamber 14 and cylinder 6. Therefore, as the landing gear continues to be extended and the strut 5 is expanded by the pressure acting on plunger 7, and the weight of the wheel, the pressure drop resulting from the displacement of the plunger in the cylinder occurs both in the cylinder and chamber 14. This pressure drop is indicated by tracing curve B from the point C thereon to the point F. It will be noted that at the point F the curves A and B coincide, from which it will be seen that, with the landing gear in fully extended position and the valve 17 therefore closed, that the strut pressure is restored to normal and said strut is therefore conditioned to function in the normal way for landing of the airplane, during which the pressures within the strut cylinder may vary as represented in the curve A.

It may be here noted that the valve 17 is preferably closed with the landing gear fully retracted, as described, to prevent the flow of oil from the oleo shock strut into the chamber 14.

A pressure-responsive valve or check valve is employed, in order that the valve may open automatically and remain open whenever the pressure in the cylinder 6 is less than that in the auxiliary chamber 14. Such a condition may occur when the landing gear is so rapidly extended that the cam 31 frees the valve push rod 30 before the pressures in the chamber 14 and cylinder 6 are equalized. Under such conditions the check valve will remain open until the pressure in both chambers is equalized and will thereafter close to retain the increased pressure in the strut cylinder during its normal operating functions.

The arrangement of the component parts of valve 17, shown more clearly in Figure 2, affords certain advantages in the organization of the landing gear of the invention. The valve is particularly adapted for operation in relatively high pressures by the arrangement of the push rod 30 normally out of engagement with the stem 29 of the check valve. The pressure within the valve housing 28, acting on the net effective area of the bellows 36, tends to push the rod 30 out of the housing, this tendency being resisted by the rod engaging the cam 31. The check valve, however, being separate from the push rod, is not subjected to this action on the push rod and may therefore operate without influence from this source when subjected to differential pressures on each side of the valve. The valve unit 17 is adapted for operation, both as a pressure-responsive check valve, and as a positive action valve when operated by the cam 31 and associated mechanism and is therefore ideally suited for its function in the landing gear.

Having now made certain the nature and purposes of my invention, and at least one mode of executing same, in such manner as to enable anyone skilled in the art to which it appertains, to make and use same, as required by the statutes, that which I claim as my property, and desire to secure by Letters Patent of the United States, is:

1. In a retractable landing gear having a shrinkable shock absorber strut including an oleo-pneumatic cylinder hinged to the aircraft and a plunger slidable in said cylinder, the upper part of said cylinder normally containing only air: a transverse partition subdividing said upper part of said cylinder, that is more specially reserved for air, into two separate and normally closed cylindrical chambers for containing pre-compressed air; the air pressure in both of said closed air chambers being maintained always at a value above atmospheric; a conduit between said chambers; an air transfer valve mounted in said conduit, said valve being normally closed; and mechanical means responsive to movements of the landing gear between extended and retracted positions for momentarily opening said valve when said strut is being shrunk.

2. In an aircraft retractable landing-gear having a shrinkable shock-absorber strut including an oleo-pneumatic cylinder hinged to the aircraft and a plunger reciprocable in said cylinder, the upper part of said cylinder normally containing only air: a transverse partition subdividing said upper part of said cylinder into two, superposed cylindrical chambers adapted to contain pre-compressed air; a conduit between said two chambers; a normally closed air-transfer valve mounted in said conduit; pressure-responsive control means automatically responsive to momentarily open said air-valve when the air pressure in the upper of said two chambers exceeds the air-pressure in the lower by a predetermined amount; and control means responsive, independently of said pressure-responsive means, to movements of the landing gear for maintaining said valve open during the entire shrinking movement of said strut.

3. In a retractable landing gear having a shrinkable shock absorber strut including an oleo-pneumatic cylinder hinged to said aircraft, said cylinder having a wheel carrying plunger slidable therein and having a cushion of pre-compressed air trapped in said cylinder above the oil level; a transverse partition forming the upper part of said cylinder into a relief auxiliary air chamber adapted to contain a relatively much larger volume of pre-compressed air than said air cushion; inflation means mounted in one of the walls of said chamber to compress the air therein; and an air valve carried by said strut and adapted to momentarily establish one-way communication from said air cushion into said auxiliary air chamber when said strut is shrunk and to momentarily establish a one-way communication in the opposite direction from said auxiliary air chamber into said air cushion when the air pressure of said cushion falls substantially below the air pressure prevailing in said auxiliary chamber.

4. In a landing gear according to claim 1: pressure-responsive means for maintaining the air transfer valve normally closed; a cam-controlled actuator carried on the strut for opening said valve against the action of said pressure-responsive means; and means, interposed between said actuator and a fixed member of the aircraft, for operating said actuator incident to the retractive and extensive movements of the landing gear.

5. In a landing gear according to claim 1: pressure-responsive means for maintaining the air transfer valve normally closed; an actuator slidably mounted on the strut for opening said valve against the action of said pressure-responsive means; a rotatable cam carried on said strut for operating said actuator; and means, responsive to movements of the landing gear between extended and retracted positions, for controlling the rotation of said cam.

6. The combination of: a pivoted oleo-pneumatic telescoping strut containing air above the oil, and having the upper part of the strut above the oil further divided into separate airtight chambers, the air pressure therein being maintained always above atmospheric and the pressure in the uppermost of which is always maintained at least equal to that of the lower, each of said chambers containing separate bodies of pre-compressed air, with: means for telescopingly shrinking the strut upon its pivotal movement in one direction, conduit means lying outside said strut and connecting said chambers, a valve for controlling the passage of air through said conduit in both directions between said chambers, and means responsive to the bodily pivoting and shrinking movement of the strut in one direction for opening said valve to permit passage of air through the conduit as the strut telescopes.

7. In an aircraft landing gear, the combination with a pivotally mounted telescopic oleo-strut, of means for shrinking said strut upon its pivotal movement in one direction, a partition within the air chamber of said strut dividing it into a pair of airtight chambers, a conduit establishing communication between said chambers, a normally closed valve situated in and controlling air passage through said conduit in both directions, and means responsive to the pivotal shrinking movement of said strut for opening said valve.

8. In an aircraft landing gear, the combination with a pivotally mounted telescopic oleo-strut adapted to contain oil in one end thereof and air in its opposed end, of a partition dividing that portion of the strut containing air into two airtight chambers, a conduit establishing communication between said chambers, a normally closed valve coacting with and controlling the passage of air through said conduit automatically operable in response to differential air pressures in said chambers to permit transfer of air from one to the other of said chambers upon the pivotal movement of the strut in one direction, and means operable in response to the pivotal movement of the strut in the opposite direction to positively open said valve.

ARTHUR R. PARILLA.